US012631291B2

(12) United States Patent
Mody et al.

(10) Patent No.: US 12,631,291 B2
(45) Date of Patent: May 19, 2026

(54) SUCTION ATTACHMENT ACCESSORY FOR PORTABLE ELECTRONIC DEVICES

(71) Applicant: Case-Mate, Inc., Atlanta, GA (US)

(72) Inventors: Saumil Chetan Mody, Atlanta, GA (US); Jacob Andrew Mckenzie, Smyrna, GA (US); Andrew Harper, Lilburn, GA (US)

(73) Assignee: CASE-MATE, INC., Atlanta, GA (US)

( * ) Notice: Subject to any disclaimer, the term of this patent is extended or adjusted under 35 U.S.C. 154(b) by 0 days.

(21) Appl. No.: 19/285,579

(22) Filed: Jul. 30, 2025

(65) Prior Publication Data

US 2025/0354651 A1     Nov. 20, 2025

Related U.S. Application Data

(63) Continuation of application No. 19/240,934, filed on Jun. 17, 2025, now Pat. No. 12,529,448, which is a continuation of application No. 19/198,344, filed on May 5, 2025, which is a continuation-in-part of application No. 18/956,287, filed on Nov. 22, 2024, now Pat. No. 12,324,494.

(60) Provisional application No. 63/571,696, filed on Mar. 29, 2024.

(51) Int. Cl.
*F16M 13/02* (2006.01)
*H04M 1/02* (2006.01)

(52) U.S. Cl.
CPC ........ *F16M 13/022* (2013.01); *H04M 1/0203* (2025.01)

(58) Field of Classification Search
None
See application file for complete search history.

(56) References Cited

U.S. PATENT DOCUMENTS

| | | | |
|---|---|---|---|
| 8,973,880 | B2 | 3/2015 | Goffman |
| D1,030,738 | S | 6/2024 | Peng |
| 12,085,479 | B2 | 9/2024 | Thyssen et al. |
| 2014/0362283 | A1 | 12/2014 | Coppage et al. |
| 2015/0070839 | A1* | 3/2015 | Johnson .................. B60R 11/00 |
| | | | 248/205.6 |
| 2016/0324297 | A1 | 11/2016 | Moore |

(Continued)

FOREIGN PATENT DOCUMENTS

CA              3235716 A1      6/2024

OTHER PUBLICATIONS

Amazon.com ivoler Silicone Phone Mount for Magsafe Phone Cases, available at https://www.amazon.com/dp/B0CJ8QVBRK. Date unknown. Accessed Mar. 17, 2026.

(Continued)

*Primary Examiner* — Frantz Bataille
(74) *Attorney, Agent, or Firm* — Perilla Knox Hildebrandt Staley & Amy LLP

(57) ABSTRACT

An attachment accessory for attaching a mobile electronic device to a support surface, including at least one suction cup on one side thereof for attachment to a support surface, and at least one magnetic element operable for attachment of a mobile electronic device to the other side. The magnetic element may be engaged between first and second panels of the accessory. One panel may have a raised edge defining a recessed area within which the second panel may be engaged and bounded along its sides by the raised edge.

21 Claims, 10 Drawing Sheets

(56) References Cited

U.S. PATENT DOCUMENTS

| | | | |
|---|---|---|---|
| 2018/0220782 A1 | 8/2018 | Mody et al. | |
| 2019/0168683 A1* | 6/2019 | Wang | .................. F16M 13/022 |
| 2021/0341097 A1 | 11/2021 | Mckinney | |
| 2021/0400854 A1* | 12/2021 | Allegoren | ................ H01F 7/02 |
| 2022/0116491 A1 | 4/2022 | Chiang et al. | |
| 2024/0225267 A9 | 7/2024 | Simon | |
| 2024/0267446 A1 | 8/2024 | Bieber et al. | |

OTHER PUBLICATIONS

Casely Grippy MagSafe Mount, available at https://www.amazon.com/dp/B0CSKT138P/ref=sspa_dk_detail_5. Date unknown. Accessed Mar. 17, 2026.
Joyroom Magnetic Suction Cup Phone Mount, available at https://www.amazon.com/gp/product/B0CLVG8TYC?ie=UTF8&th=1&linkCode=sl1&tag=kristinaqui06-20&linkId=e6ca3de2d1e1d8d9d6fe86d4d9290525&language=en_US&ref_=as_li_ss_tl. Date unknown. Accessed Mar. 17, 2026.
NTIdea "Silicone Suction Phone Case Magnetic Phone Mount" (the "NTIdea Mount") available at https://www.amazon.com/NTidea-Silicone-Magnetic-Hands-Free-Accessory/dp/B0C9LTBNPQ/ref=cm_cr_srp_d_product_top. Date unknown. Accessed Mar. 17, 2026.
Octobuddy. Date unknown. Accessed Mar. 17, 2026.

* cited by examiner

DETAIL D

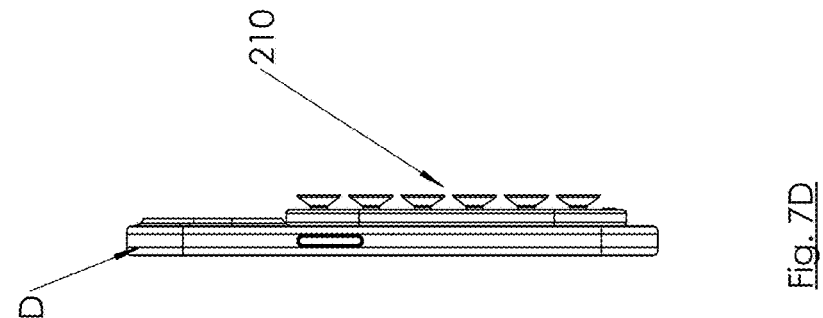
Fig. 7D
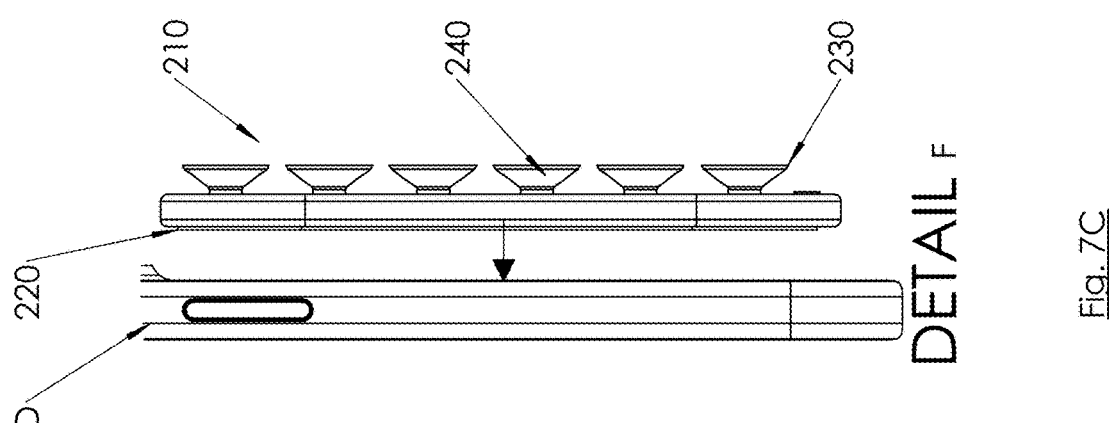
DETAIL F
Fig. 7C
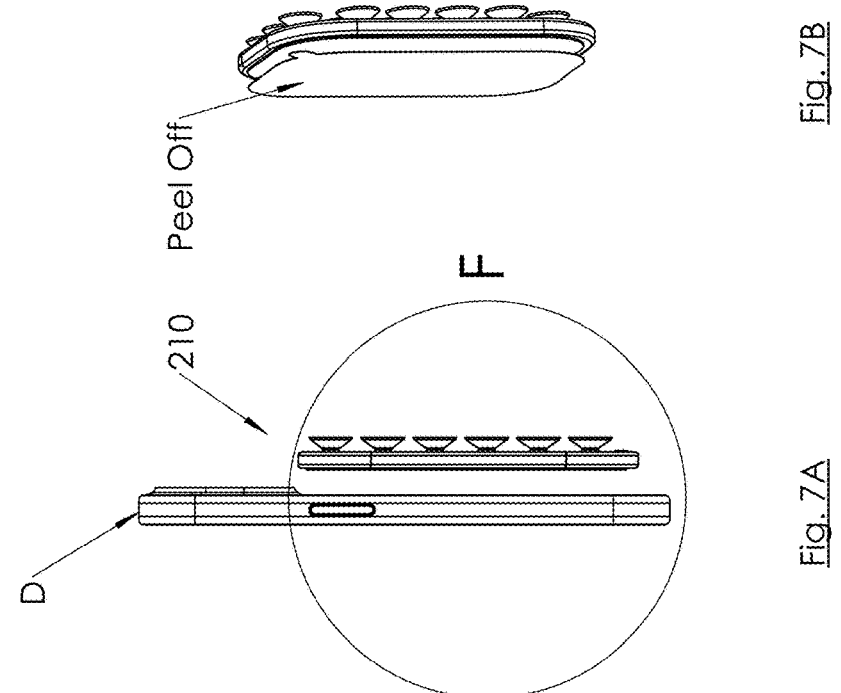
Fig. 7B
Fig. 7A

DETAIL D

SUCTION ATTACHMENT ACCESSORY FOR PORTABLE ELECTRONIC DEVICES

CROSS-REFERENCE TO RELATED APPLICATIONS

This application is a continuation of U.S. patent application Ser. No. 19/240,934 filed Jun. 17, 2025, which is a continuation of U.S. patent application Ser. No. 19/198,344 filed May 5, 2025, which is a continuation-in-part of U.S. patent application Ser. No. 18/956,287 filed Nov. 22, 2024, which claims priority to U.S. Provisional Patent Application Ser. No. 63/571,696, filed Mar. 29, 2024, all of which are incorporated herein by reference.

TECHNICAL FIELD

The present invention relates generally to the field of accessories for mobile electronic devices, and more particularly to an accessory for attachment to a mobile phone or other portable electronic device, and/or to a case for such a device, configured to allow a user to secure the device by suction-attachment to a support surface for hands-free use of the mobile phone or other portable electronic device, and/or to secure other accessories or articles to the mobile phone or other portable electronic device.

BACKGROUND

Mobile phones and other portable electronic devices can be difficult to hold and operate for some users and in some applications, for example with larger devices and/or in single-handed modes of use. In some situations, users may wish to support their mobile electronic devices in one or more hands-free positions or orientations, for example, for attachment to a mirror, window, cabinet, monitor screen, or other attachment surface, when viewing media or talking on the device. In other situations, users may wish to secure other accessories or articles to their mobile electronic devices and/or to cases for such devices to reduce the number of loose articles to hold or carry on their persons.

Accordingly, it has been found that needs exist for improved attachment or mounting accessories for mobile phones and/or other portable electronic devices to assist a user in securely supporting the device, attaching the device to a surface, and/or reducing the number of loose articles to hold or carry on their person. It is to the provision of improved attachment or mounting accessories for mobile phones and other portable electronic devices meeting these and other needs that the present invention is primarily directed.

SUMMARY

In example embodiments, the present invention provides a suction attachment accessory for a mobile phone or other portable electronic device. The suction attachment accessory can be magnetically or adhesively attached to a phone or other mobile device, to a protective or decorative case containing the mobile device, or to other components engaged with the device, or can be configured as an integral part of the device or case.

In one aspect, the invention relates to an attachment accessory for attaching a mobile electronic device to a support surface, the attachment accessory preferably including a support surface engagement portion comprising an engagement portion panel having a first side and a second side, the first side comprising at least one suction cup, and further comprising a raised edge extending transversely from the second side around a perimeter thereof and defining a recessed area. The attachment accessory preferably also includes a magnetic attachment portion comprising a magnetic attachment portion panel configured to be received within the recessed area and bounded along its sides by the raised edge extending transversely from the second side of the engagement portion panel. The attachment accessory preferably further includes at least one magnetic element retained between the engagement portion panel and the magnetic attachment portion panel.

In another aspect, the invention relates to an attachment accessory for attaching a mobile electronic device to a support surface, the attachment accessory preferably including a first panel having a first side and a second side, the first side comprising at least one suction cup. The attachment accessory preferably also includes at least one magnetic element, and a second panel attached to the first panel with the at least one magnetic element engaged between the first and second panels.

In another aspect, the invention relates to an attachment accessory for attaching a mobile electronic device to a support surface, the attachment accessory preferably including a body portion having a first side and a second side opposite the first side, at least one suction cup on the first side of the body portion configured for attachment to a mobile electronic device, and at least one suction cup on the second side of the body portion configured for attachment to a mounting surface.

In another aspect, the invention relates to an attachment accessory for attaching a mobile electronic device to a support surface, the attachment accessory preferably including a body portion having a first side and a second side opposite the first side, a first array of rows and columns of suction cups on the first side of the body portion configured for attachment to a mobile electronic device, and a second array of rows and columns of suction cups on the second side of the body portion configured for attachment to a mounting surface.

In another aspect, the invention relates to an attachment accessory for attaching a mobile electronic device to a support surface, the attachment accessory preferably including a body portion having a first side and a second side opposite the first side, a first array of four rows and four columns of suction cups on the first side of the body portion configured for attachment to a mobile electronic device, and a second array of four rows and four columns of suction cups on the second side of the body portion configured for attachment to a mounting surface.

In another aspect, the invention relates to an accessory for a mobile electronic device for securing the mobile electronic device to a support surface, such as for example a mirror, window, cabinet, monitor screen, or other attachment surface. The accessory comprises a device attachment portion for permanently or removably attaching the accessory to the mobile electronic device. The accessory further comprises a support surface attachment portion for releasably securing the accessory to the support surface. In example embodiments, the support surface portion comprises one or more suction cups on an exterior surface thereof for attaching or mounting the electronic device to a smooth and flat support surface, such as for example mirrors and windows, walls, monitors or display screens, tabletops, or other generally flat and smooth surfaces.

In another example embodiment, the present invention relates to a method of manufacturing such an accessory for a mobile electronic device. The method comprises the steps of providing a first plate or panel having one or more grooves, embedding or placing one or more magnets in the one or more grooves, securing a second plate or panel to the first plate with the one or more magnets embedded between the first and second plates, securing the combined first and second plates to in a recessed area on the first side of a third plate, the third plate comprising an engaging element on its second side opposite its first side. Alternatively, an adhesive material may be applied for attachment, instead of or in addition to the magnet(s).

In another example embodiment, the invention relates to a method of use of such an accessory to support an electronic device on a support surface, such as for example a mirror, window, cabinet, monitor screen, or other attachment surface. The method of use preferably comprises permanently, semi-permanently, or removably attaching the accessory to the mobile electronic device, or to a case or other accessory attached to the mobile electronic device, for example by magnetic or adhesive attachment. The method of use preferably further comprises releasably securing the accessory to the support surface, for example by engagement of one or more suction cups of the accessory to the support surface. The method optionally further comprises releasing or repositioning the device on the same or another support surface by selective disengagement of the suction cup attachment.

In another aspect, the invention relates to an attachment accessory for attaching a mobile electronic device to a support surface, including a device attachment portion configured for attachment to the mobile electronic device, and a support surface attachment portion including at least one suction cup.

In another aspect, the invention relates to an attachment accessory for attaching a mobile electronic device to a support surface, including a device attachment portion having at least one magnetic element configured for magnetic attachment of the attachment accessory to the mobile electronic device, and a support surface attachment portion including at least one suction cup.

In another aspect, the invention relates to an attachment accessory for attaching a mobile electronic device to a support surface, including a device attachment portion having an adhesive material configured for adhesive attachment of the attachment accessory to the mobile electronic device, and a support surface attachment portion including at least one suction cup.

These and other aspects, features and advantages of the invention will be understood with reference to the drawing figures and detailed description herein and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIGS. 7A, 7B, 7C and 7D (collectively, FIG. 7) show side and detailed views of adhesive attachment of the suction attachment accessory apparatus of FIGS. 6A and 6B to a portable electronic device, according to an example method of use of the present invention.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
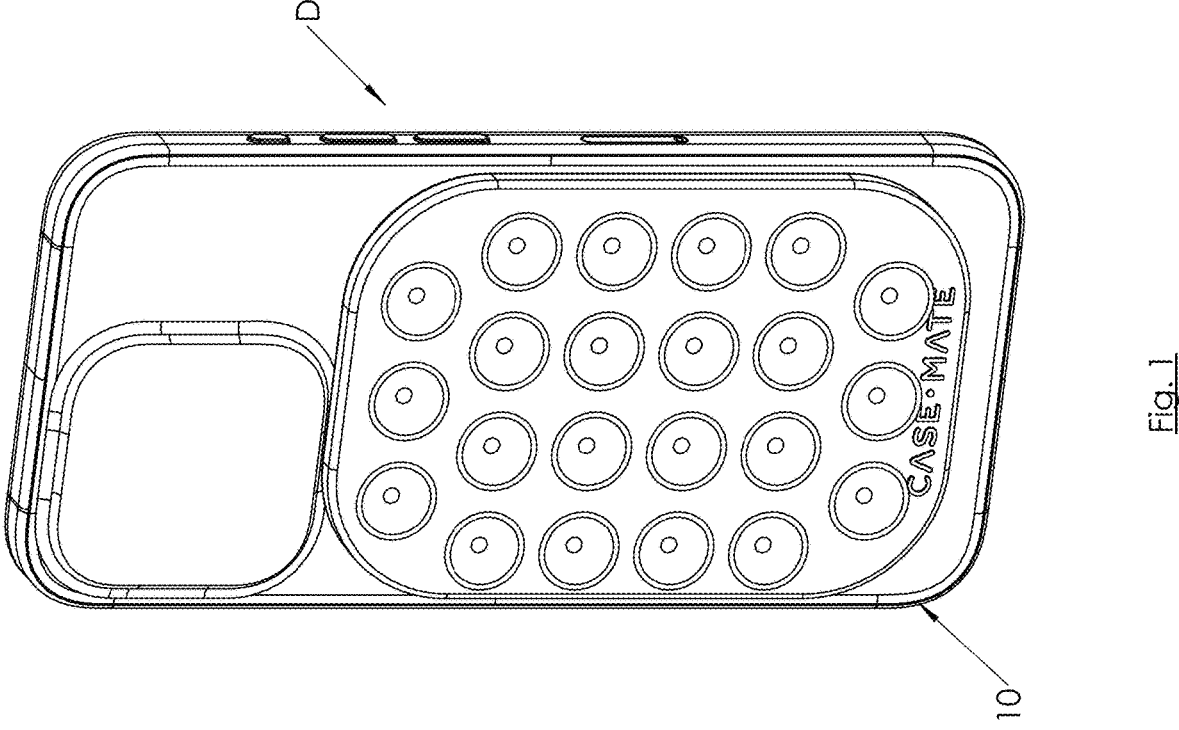
FIG. 1 is a perspective view of a suction attachment accessory apparatus attached to a mobile electronic device according to an example embodiment of the present invention.

With reference now to the drawing figures, wherein like reference numbers represent corresponding parts throughout the several views, FIGS. 1 and 2 (2A, 2B and 2C) show an example embodiment of a suction attachment accessory apparatus 10 for securing a mobile phone or other electronic mobile device D to a support surface such as for example glass, windows, tabletops, mirrors, cabinets, monitor screens, or other generally flat and smooth, non-porous surfaces. Generally described, the suction attachment accessory apparatus 10 comprises a first or device attachment portion 20 for attachment of the suction attachment accessory to the device, and a second or support surface attachment portion 30 for attachment of the suction attachment accessory to the support surface. In particular, embodiments, the first or device attachment portion 20 comprises one or more magnets, an adhesive material, and/or other components, materials or means for providing a secure attachment (detachable, semi-permanent or permanent) to the device D. In example embodiments, the second or support surface attachment portion 30 includes one or more suction cups 32 configured for attachment to the support surface.

The suction cup(s) 32 preferably comprise a flexible and resilient, non-porous material such as plastic or rubber, with a smooth and continuous open rim and a closed air-tight curved three-dimensional surface opposite the rim. Placing the second or support surface attachment portion 30 of the apparatus against the support surface forms contact between the rim(s) of the suction cup(s) 32 and the support surface and defines a variable volume chamber between the flexible cup and the support surface. Pressing the suction attachment accessory apparatus 10 further against the support surface causes flexure of the suction cup and compression of the variable volume chamber, thereby pushing air out from the space between the support surface and the suction cup. The thin, flat edge of the rim of the suction cup forms a seal with the support surface that prevents air from reentering. The resilience of the suction cup biases away from the support surface, creating a lower air pressure or vacuum within the variable volume chamber inside the suction cup, relative to the higher ambient air pressure outside the suction cup (i.e., a negative fluid pressure differential), causing the second or support surface attachment portion 30 to adhere to the support surface until the seal is broken by application of sufficient force to retract the rim of the suction cup(s) away from the support surface.

The attachment forces provided by the first (device) and second (support surface) attachment portions are selected to sufficiently support the weight of the device D and any attachments or accessories and retain the device in a fixed position on the support surface for an extended duration of time, according to intended applications and modes of use. Optionally, a generally planar array comprising a plurality of suction cups 32 are provided on the second or support surface attachment portion 30, for example, at least three suction cups, and capable of holding a mobile phone or other device D in a vertical position on a smooth surface such as a vertical glass or mirror surface for a specified period of time or indefinitely. In example embodiments, the suction attachment is sufficient to hold a device weight of at least 150 g for at least 30 seconds, and more preferably to hold a device weight of at least 306 g for a duration of at least 120 minutes. In the depicted example embodiment, a generally rectangular array of 22 suction cups 32 arranged in rows and columns is provided, but in other examples fewer or more may be provided in various configurations.

Figure 2C:
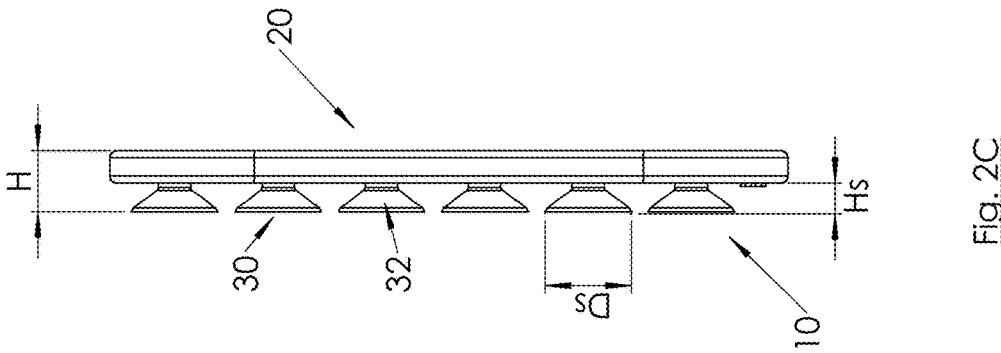
FIGS. 2A, 2B and 2C (collectively, FIG. 2) show front, back and side views of a suction attachment accessory apparatus according to an example embodiment of the present invention.
Figure 2B:
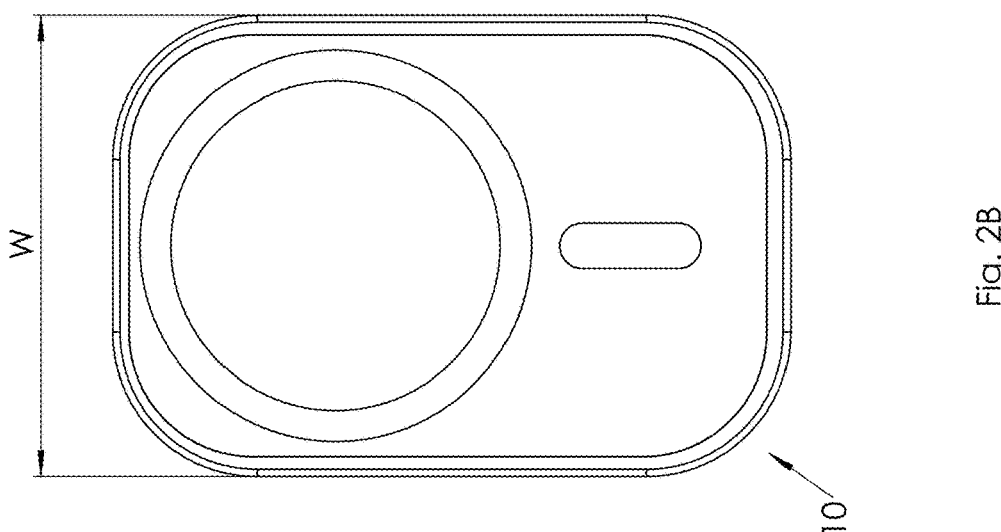
Figure 2A:
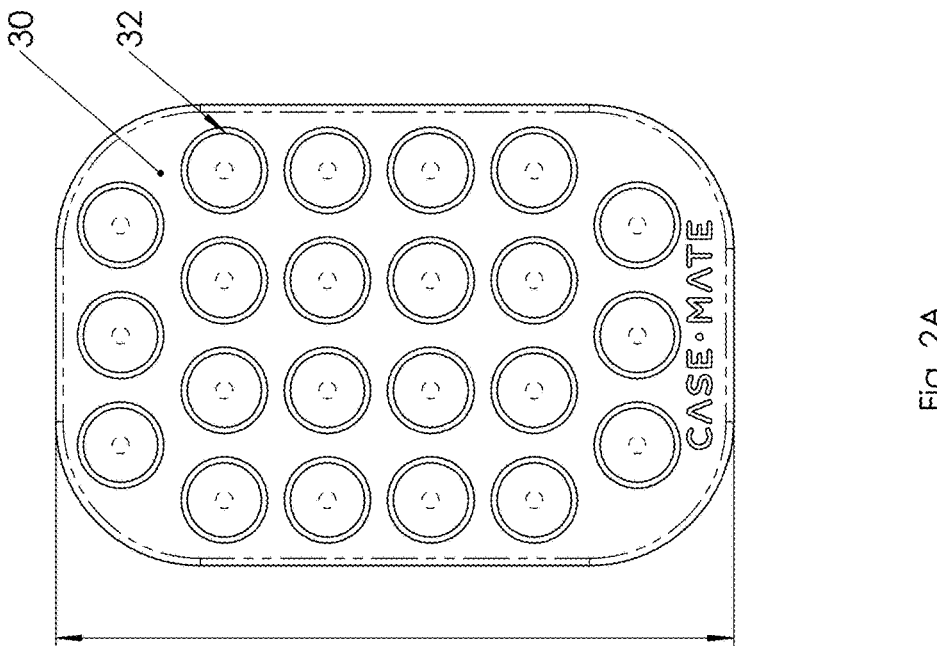

As shown in FIGS. 2A, 2B and 2C, the device holder comprises an overall width W, an overall length L, and an overall thickness or height H measured between the peak of the engagement element or suction cups and the rear side of the device holder. The suction cups comprise a diameter $D_S$ and a height $H_S$. In example embodiments, the device holder comprises an overall width W between about 60 mm and about 70 mm, an overall length L between about 90 mm and about 100 mm, and an overall height H between about 7 mm and about 10 mm. In particular embodiments, the device holder comprises an overall width W of about 64 mm, an overall length L of about 94 mm, and an overall height H of about 8.5 mm. In example embodiments, the suctions cups comprise diameters $D_S$ between about 10 mm and about 15 mm and heights $H_S$ between about 3 mm and about 6 mm. In a particular embodiment, the suctions cups comprise diameters $D_S$ of about 12 mm and heights $H_S$ of about 4.0 mm.

Figure 3B:
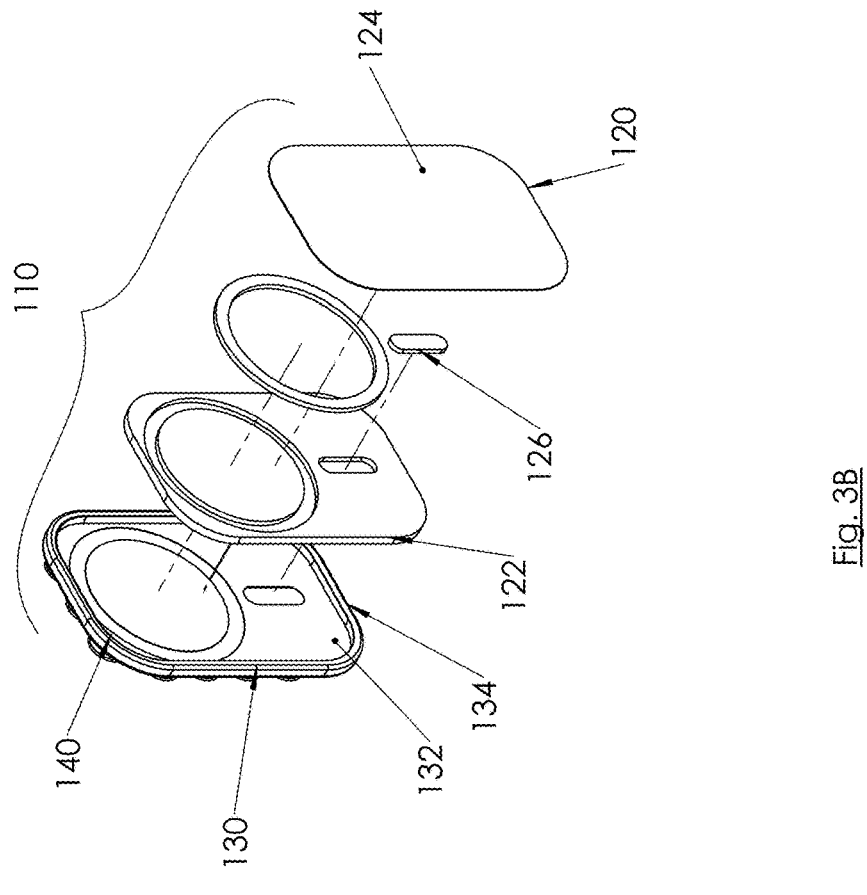
FIGS. 3A and 3B (collectively, FIG. 3) show perspective assembly views of a suction attachment accessory apparatus with magnetic device attachment, according to an example method of manufacturing an embodiment of the present invention.
Figure 3A:
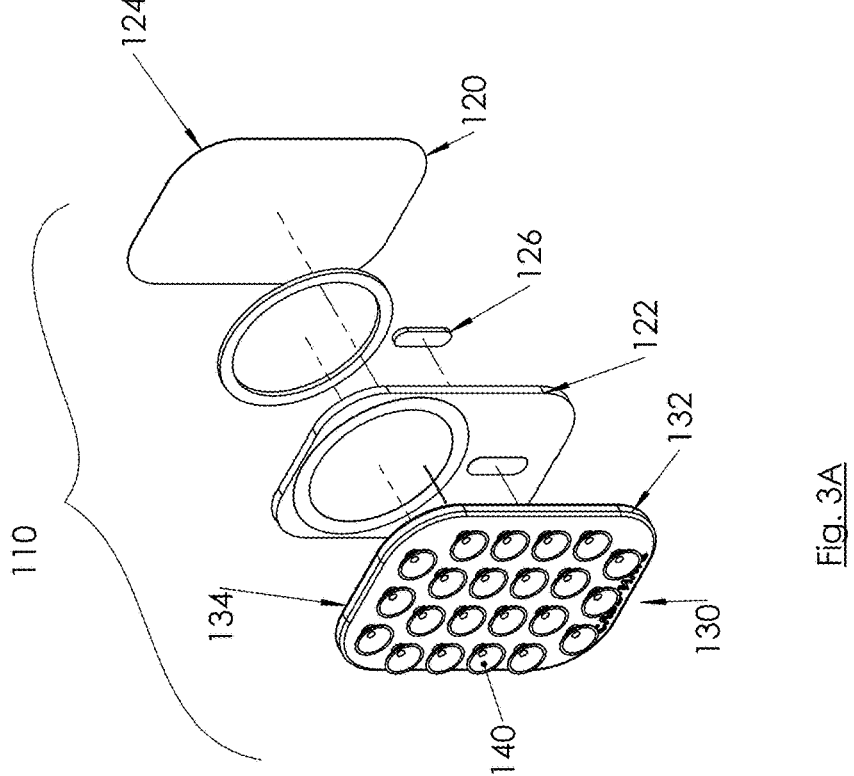
Figure 4C:
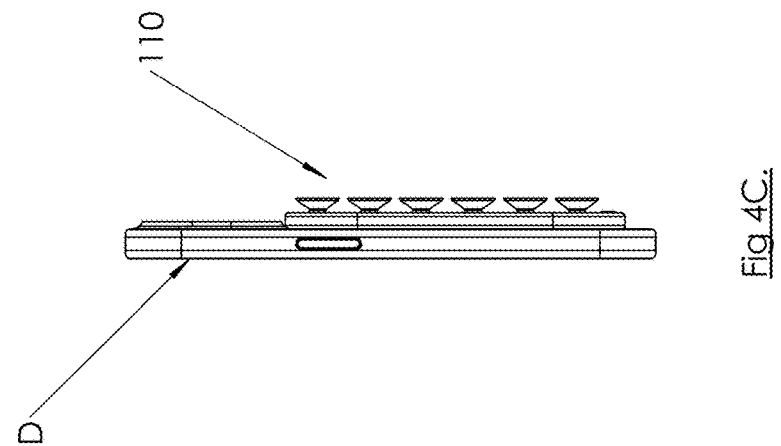
FIGS. 4A, 4B and 4C (collectively, FIG. 4) show side and detailed views of magnetic attachment of the suction attachment accessory apparatus of FIGS. 3A and 3B to a portable electronic device, according to an example method of use of the present invention.
Figure 4B:
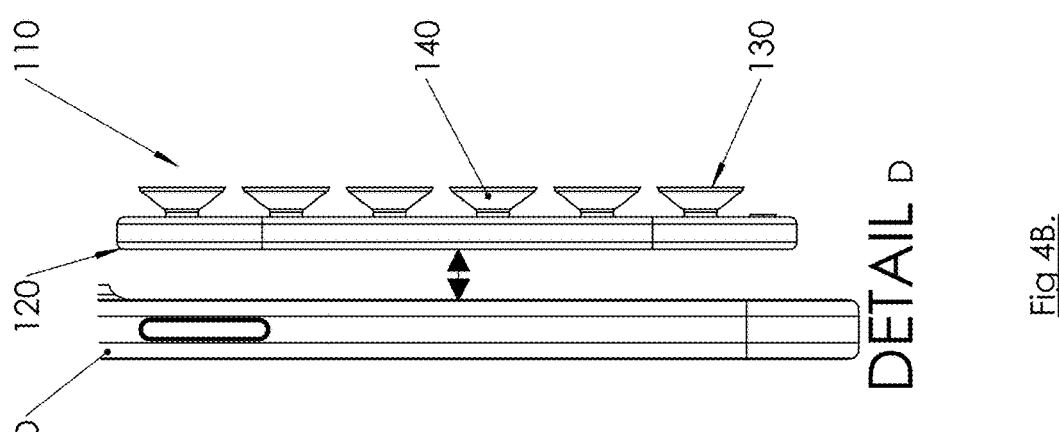
Figure 4A:
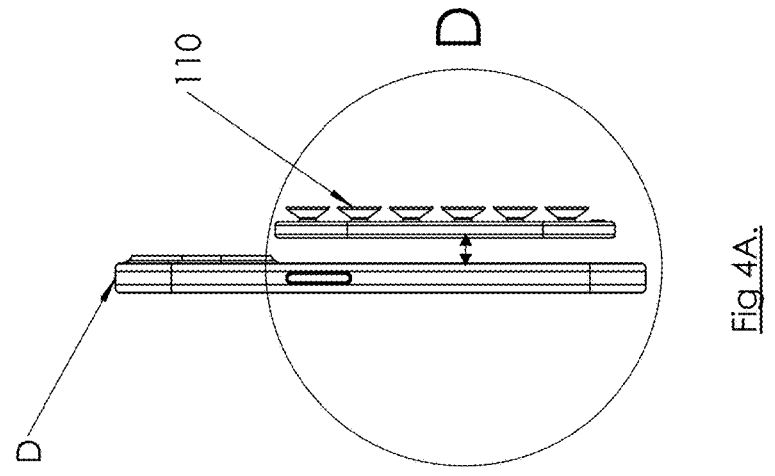

FIG. 3 (FIGS. 3A and 3B) and FIG. 4 (FIGS. 4A, 4B and 4C) show a magnetic-attachment embodiment of the device holder or suction attachment accessory apparatus 110. In example embodiments, the accessory apparatus or device holder 110 generally includes a magnetic device attachment portion 120 for securing the device holder to a mobile phone or other electronic device D (or to a case or other component(s) attached to the mobile phone or other electronic device). The magnetic device attachment portion 120 generally includes a first plate or panel 122, a second plate or panel 124, and one or more magnets 126 embedded or otherwise provided between the first and second panels. In example embodiments, the first plate or panel 122 comprises one or more recesses or grooves for receiving the one or more magnets 126. The device holder or suction attachment accessory apparatus 110 further includes a support surface attachment/engagement or adaptor portion 130 for engaging support surfaces, such as for example mirrors, windows, screens, tabletops, etc., for hands-free use of the mobile phone or other electronic device D. The engagement or support surface attachment portion 130 includes a third plate or panel 132 having a first side or surface and a second side or surface opposite the first side or surface. The engagement portion further includes engaging elements 140 for engaging the support surface and holding the mobile phone or other electronic device to the support surface. In example embodiments, the engaging elements 140 include one or more suction cups extending generally transversely from the first side or surface of the third plate or panel 132. The engagement portion 130 optionally further includes a raised edge or wall 134 extending transversely from the second side or surface of the third plate or panel and around the perimeter thereof to define a recessed area or cavity for receiving and attachment of the magnetic attachment portion 120.

In example embodiments, the first and second plates or panels 122, 124 of the magnetic device attachment portion 120 are made from rigid materials while the support surface engagement portion 130 is made from a flexible material. In particular embodiments, for example, the first and second plates or panels 122, 124 are made from, or generally comprise, a polycarbonate material, whereas the engagement portion 130 is made from, or generally comprises, a 50 A silicone material.

Example methods of manufacture include the steps of providing a first plate 122 optionally having one or more grooves formed therein, embedding or placing one or more magnets 126 within the one or more grooves or between the first and second panels 122, 124, securing the second panel to the first panel with the one or more magnets embedded between the first and second panels, securing and permanently attaching the first and second panels to the third panel 132 within its recessed area along a first side thereof, wherein the third panel comprises an accessory engaging element 140 on its second side opposite the first side.

In example embodiments, the magnetic attachment portion 120 comprises at least one permanent magnet or magnetic element 126 configured for magnetic attraction and attachment to one or more magnetic components within the phone or other mobile electronic device and/or to a case for the mobile device, with the magnet configuration, location and polarity configured for compatibility with commercially available products such as for example products incorporating or compatible with the Apple MagSafe™ magnetic attachment system. As shown in FIGS. 4A, 4B, 4C and 4D, the magnetic attraction between the magnetic attachment base 120 and the mobile device D allows the accessory apparatus 110 to be securely but removably affixed, and therefore removably attached, to the surface of the mobile device or a case or other components attached to the mobile device. In some embodiments, a case attached directly to the mobile device additionally or alternatively comprises one or more magnetic components that magnetically engage the holder apparatus. In example embodiments, the at least one magnet or magnetic element 126 of the attachment base portion comprises a full or partial circular ring-shaped or annular magnetic array of magnetic element(s) extending substantially continuously 360° around the generally annular body of the attachment base portion. In alternate embodiments, the accessory apparatus 110 may be attached to a mobile device or case for a mobile device by other or additional attachment means such as hook-and-loop fasteners, releasable adhesive, detachable clips or other couplings, inter-engaging friction-fit elements, other magnetic arrangements, or the like.

Figures 5A, 5B, 5C:
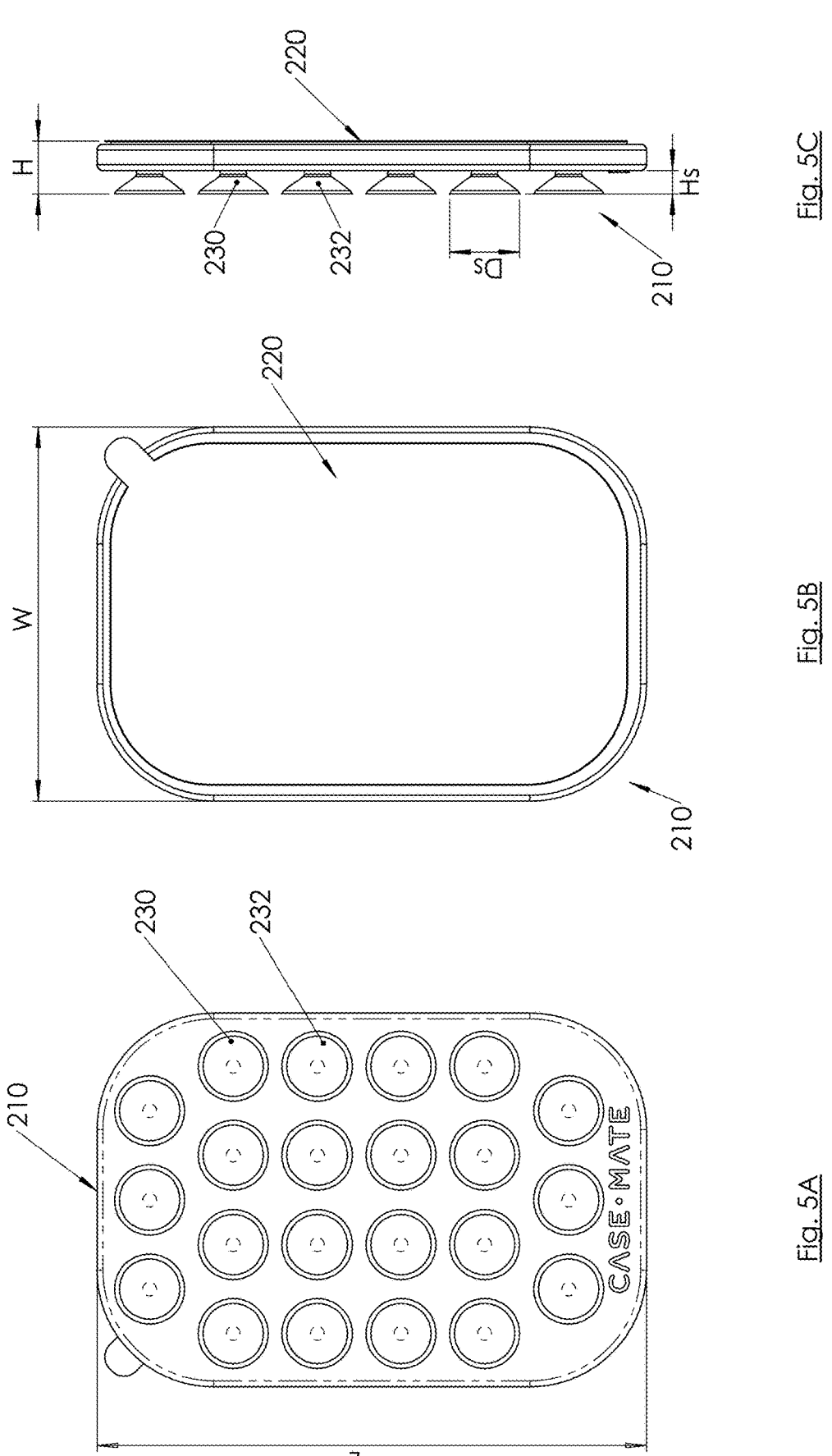
FIGS. 5A, 5B and 5C (collectively, FIG. 5) show front, back and side views of a suction attachment accessory apparatus according to another example embodiment of the present invention.
Figure 6B:
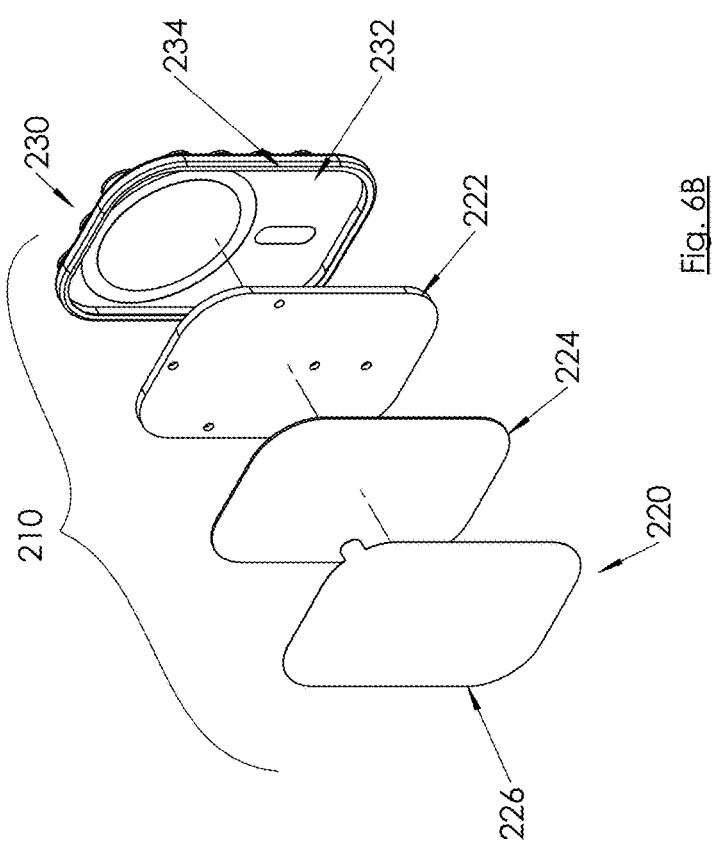
FIGS. 6A and 6B (collectively, FIG. 6) show perspective assembly views of a suction attachment accessory apparatus with adhesive device attachment, according to an example method of manufacturing an embodiment of the present invention.
Figure 6A:
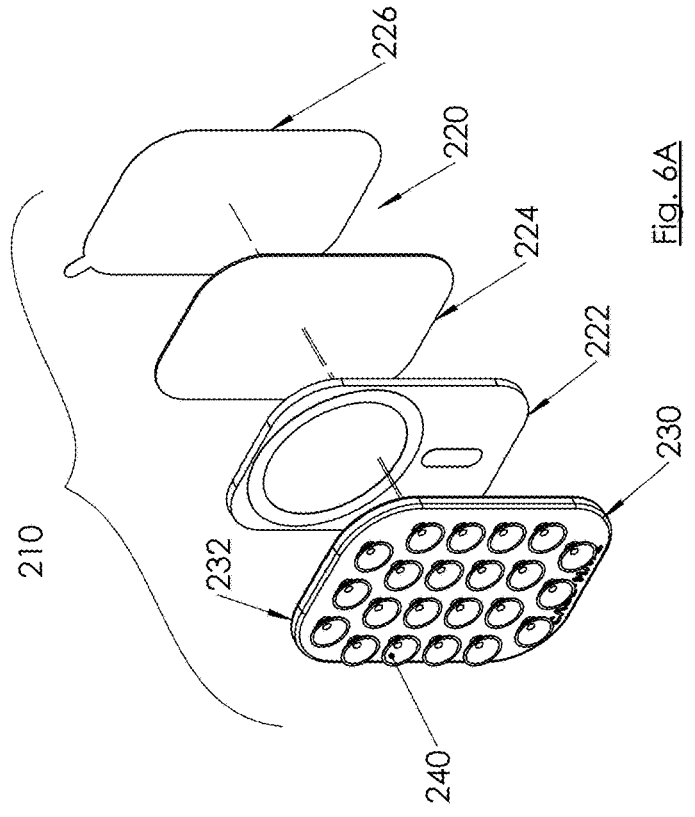

FIG. 5 (FIGS. 5A, 5B and 5C), FIG. 6 (FIGS. 6A and 6B), and FIG. 7 (FIGS. 7A, 7B, 7C and 7D) show another example embodiment of a suction attachment accessory apparatus 210, substantially similar in construction, manufacture and use to the above-described embodiment, with differences as noted. In example embodiments, the accessory apparatus or device holder 210 generally includes an adhesive device attachment portion 220 for securing the device holder to a mobile phone or other electronic device D (or to a case or other component(s) attached to the mobile phone or other electronic device). The adhesive device attachment portion 220 generally includes a first plate or panel 222, a second plate or panel 224, and an adhesive layer with a removable cover sheet 226 applied to the second plate or panel. In example embodiments, the adhesive may comprise a 3M VHB™ Tape such as 3M VHB™ Specialty Tape 4930, or other adhesive material(s) suitable to provide a secure attachment and support. The device holder or suction attachment accessory apparatus 210 further includes a support surface attachment/engagement or adaptor portion 230 for engaging support surfaces, such as for example mirrors, windows, screens, tabletops, etc., for hands-free use of the mobile phone or other electronic device D. The engagement or support surface attachment portion 230 includes a third plate or panel 232 having a first side or surface and a second side or surface opposite the first side or surface. The engagement portion further includes engaging elements 240 for engaging the support surface and holding the mobile phone or other electronic device D to the support surface. In example embodiments, the engaging elements 240 include one or more suction cups extending generally transversely from the first side or surface of the third plate or panel 232. The engagement portion 230 optionally further includes a raised edge or wall 234 extending transversely from the second side or surface of the third plate or panel and around the perimeter thereof to define a recessed area or cavity for receiving and attachment of the adhesive device attachment portion 220.

In example methods of use, an accessory apparatus according to any of the example embodiments disclosed may be attached to a handheld or portable electronic device such as a cellphone, or to a case or other accessory attached or mounted to the electronic device, for example by magnetic or adhesive attachment. In magnetic attachment embodiments, the magnetic attachment features of the accessory apparatus and the electronic device are aligned for magnetic attraction and detachable engagement to the electronic device, case or other accessory. In adhesively attached embodiments, the cover sheet is removed to expose the adhesive material, and the accessory apparatus is positioned and adhesively attached to the electronic device, case or other accessory. Depending on the adhesive used, the attachment may be removable (easily detached manually without damage to either component), permanent (not removable without damage to one or both components) or semi-permanent (removable with a removal tool without damage). The support surface attachment/engagement or adaptor portion may be attached to a support surface, such as for example glass, windows, tabletops, mirrors, cabinets, monitor screens, or other generally flat and smooth, non-porous surfaces, by pressing the suction cup(s) of the support surface attachment portion against the support surface with sufficient manual force applied to engage the suction cup(s) in typical fashion to attach the electronic device to the support surface and maintain it in the desired position. After the intended use, the device can be removed by pulling away to detach the suction cup(s) from engagement with the support surface, and the accessory apparatus may be subsequently reused for attachment to other support surface and/or in other positions.

Figure 8:
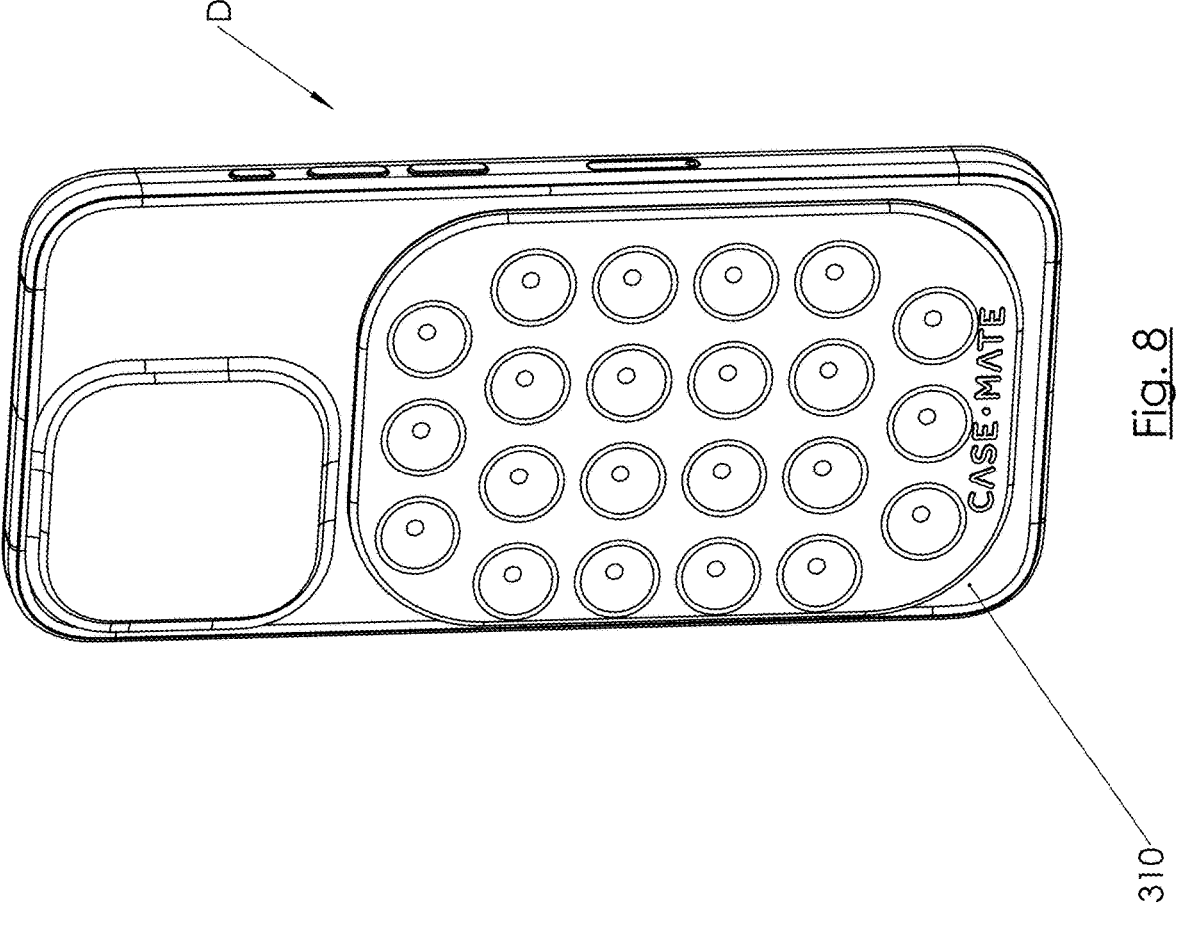
FIG. 8 shows a perspective view of a suction attachment accessory apparatus according to another example embodiment of the present invention attached to a mobile electronic device.
Figure 9C:
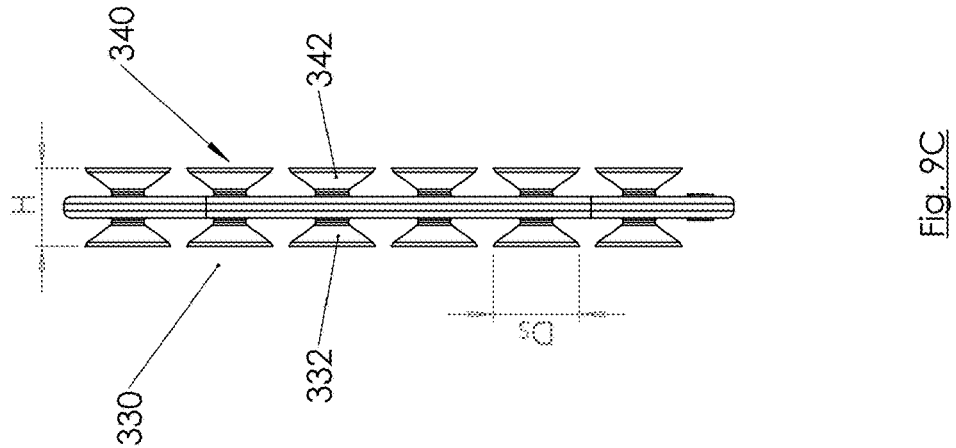
FIGS. 9A, 9B and 9C (collectively, FIG. 9) show front, back and side views of the suction attachment accessory apparatus according to the example embodiment of FIG. 8.
Figure 9B:
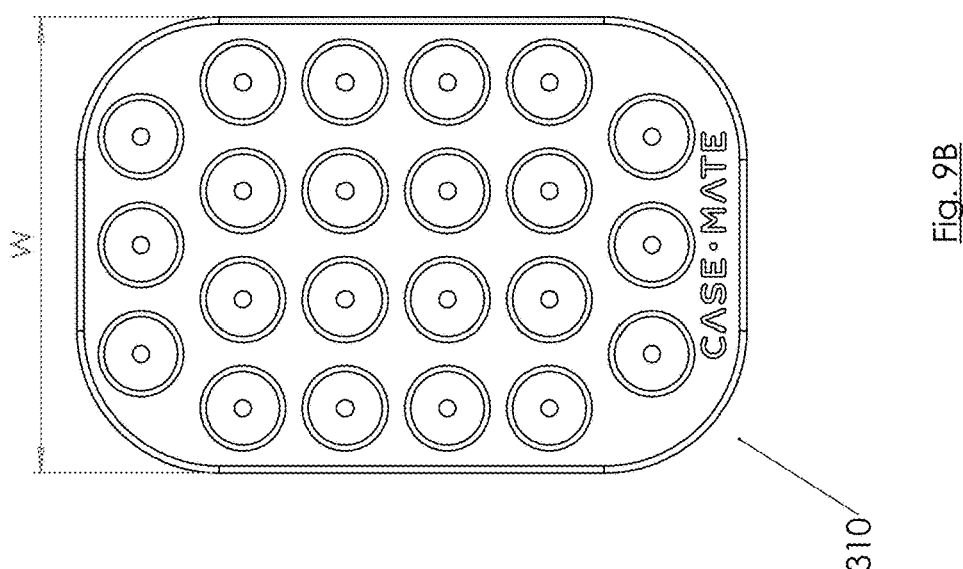
Figure 9A:
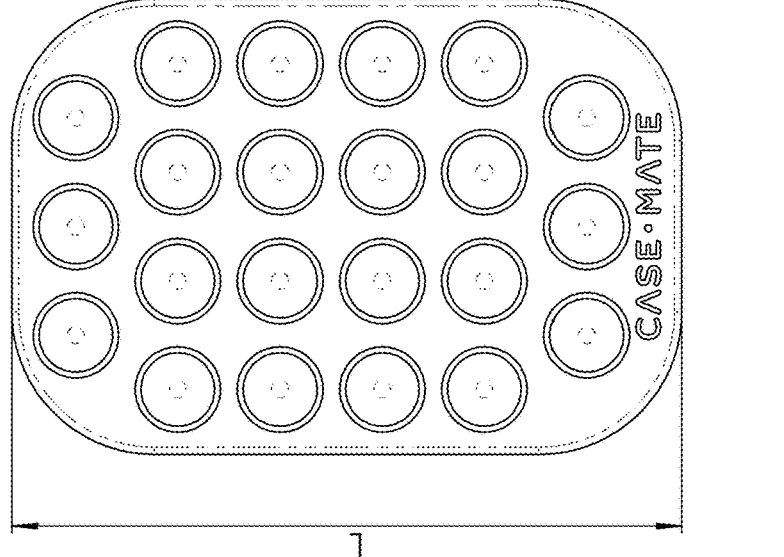
Figure 10C:
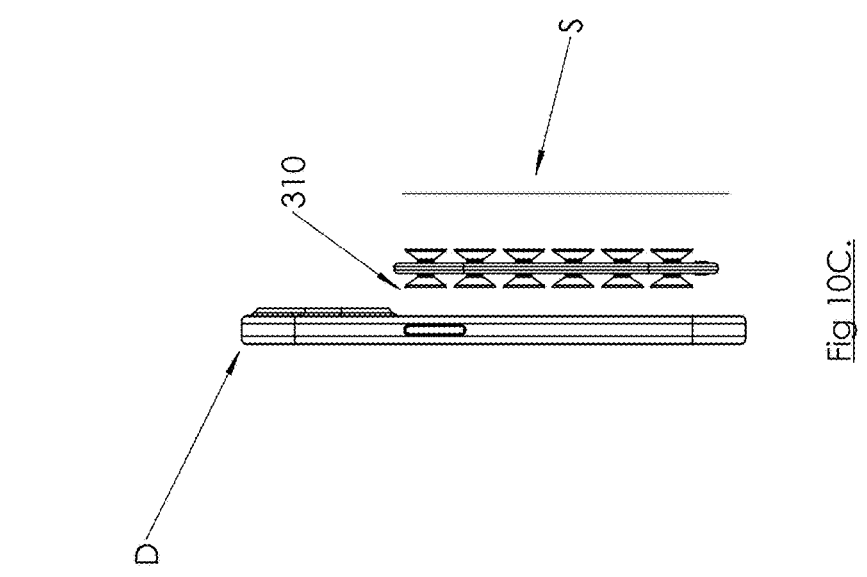
FIGS. 10A, 10B and 10C show side and detailed views of the attachment of the suction attachment accessory apparatus according to the example embodiment of FIG. 8 to a mobile electronic device.
Figure 10B:
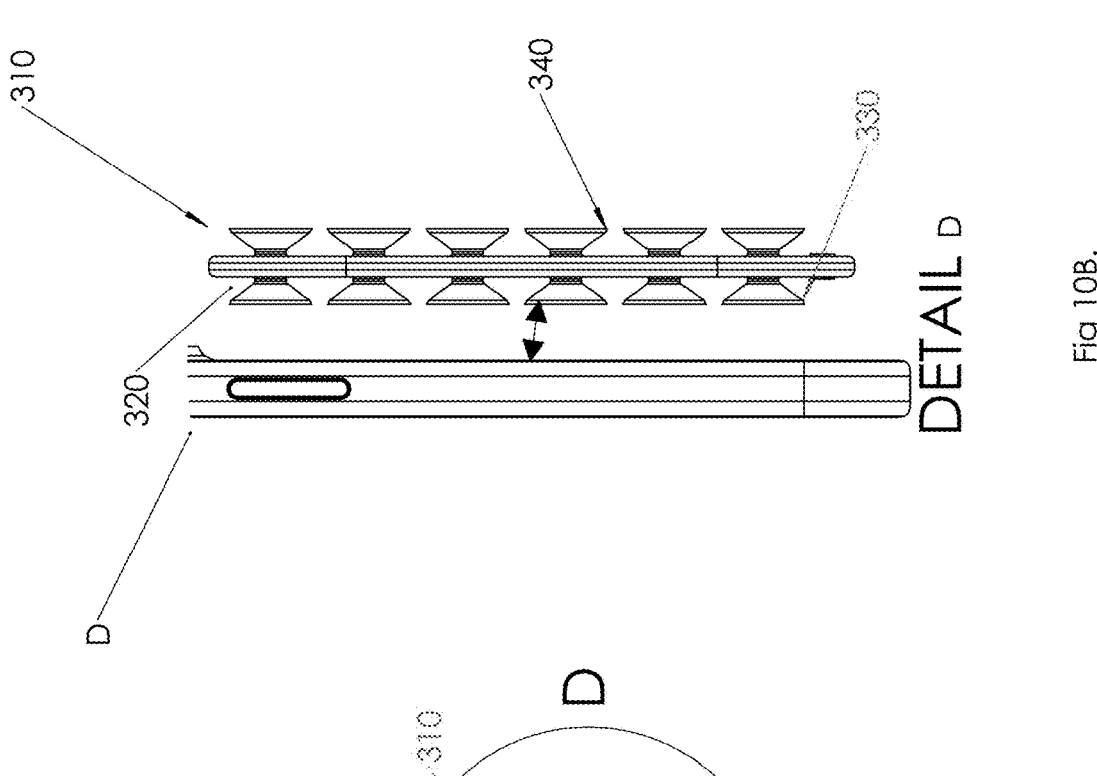
Figure 10A:
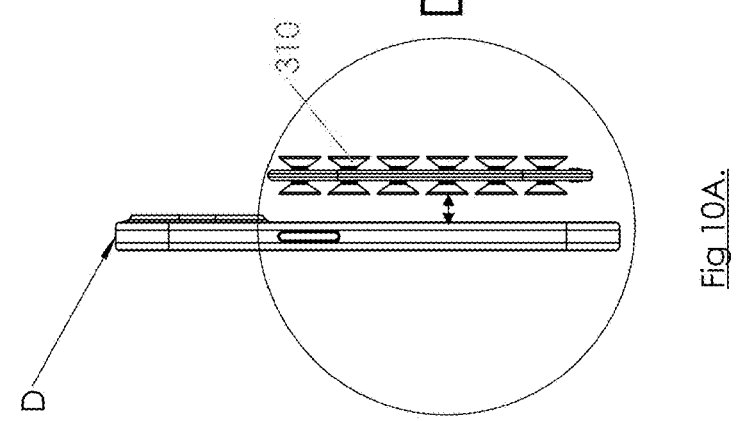

FIGS. 8-10 show another example embodiment of a suction attachment device or accessory 310 for a cellphone or other electronic device D, substantially similar to the above-described embodiments, with differences as noted. In this embodiment, the attachment accessory 310 comprises a generally flat or planar body panel or plate 320 with first and second sides, having suction attachment portions 330, 340 on both sides, respectively. The first side suction attachment portion 330 comprises at least one suction cup 332, for example a plurality of suction cups arranged in a first array, directed or facing in a first outward direction from the body panel 320; and the second side suction attachment portion 340 also comprises at least one suction cup 342, for example a plurality of suction cups arranged in a second array, directed or facing in an opposite second outward direction from the body panel 320. In example embodiments, the first array of suction cups 332 and the second array of suction cups 342 are arranged along generally parallel planes relative to the body panel 320, whereby they may be detachably or semi-permanently suction-attached to first and second surfaces (e.g., one surface being a surface of a cellphone or cellphone case, and the other surface being a mounting surface such as a mirror or window). In the depicted embodiment, the arrays of suction cups 332, 342 comprise a four-by-four array of sixteen suction cups, optionally with additional rows of three suction cups above and below, for a total of twenty-two suction cups on each of the first and second side suction attachment portions 330, 340. In some example embodiments, the first and second arrays of suction cups 332, 342 are symmetrical and the same on each side of the body panel 320 as shown in FIGS. 9A and 9B, but in alternate embodiments, asymmetrical or different suction cup configurations may be provided on the first and second sides of the body panel. The attachment accessory 310 defines a length L, a width W, and a thickness or height H, similar or identical to the above-described embodiments. In alternate embodiments, more or fewer suction cups may be provided in various different arrangements, depending on desired applications and characteristics. In the depicted embodiment, the body panel 320 is configured as a generally rectangular panel with rounded corners. In alternate embodiments, the body panel may be circular, oval, square, or otherwise configured. In some example embodiments, the body panel 320 and the first and second side suction attachment portions 330, 340 including the suction cups 332, 342 comprise a single integral and unitary structure, for example formed as a one-piece molding of plastic, rubber or other resilient flexible material. In alternate embodiments, the first and second side suction attachment portions 330, 340 can be separately formed and attached together by adhesive, thermal or solvent welding, or other bonding means.

As shown in FIG. 10, in an example method of use, the attachment accessory 310 may be suction-attached by pressing one of the first and second side suction attachment portions 330, 340 onto the device D or onto a mounting surface S, and the other of the first and second side suction attachment portions suction-attached by pressing onto the other of the device or mounting surface. The device D is thereby detachably or semi-permanently suction-attached and affixed in place on the mounting surface S, for example with the display screen of the device positioned in a plane generally parallel to that of the mounting surface. The user may operate the device D in normal fashion while attached to the mounting surface S. When desired, the user may detach the device D by pulling it away from the mounting surface S, and the attachment accessory 310 detached and removed, or left in place for future use.

While the invention has been described with reference to example embodiments, it will be understood by those skilled in the art that a variety of modifications, additions and deletions are within the scope of the invention, as defined by the following claims.

What is claimed is:

1. An attachment accessory for attaching a mobile electronic device to a support surface, the attachment accessory comprising:

an engagement panel comprising a first side and a second side, the first side comprising at least one suction cup, the engagement panel further comprising a raised edge extending transversely from the second side around a perimeter thereof and defining a recessed area;

an attachment panel configured to be received within the recessed area of the engagement panel and bounded along its sides by the raised edge extending transversely from the second side of the engagement panel; and at least one magnetic element retained between the engagement panel and the attachment panel.

2. The attachment accessory of claim 1, wherein the engagement panel comprises a flexible material.

3. The attachment accessory of claim 2, wherein the flexible material comprises a silicone material.

4. The attachment accessory of claim 1, further comprising a magnetic element alignment plate comprising at least one groove configured to receive the at least one magnetic element, wherein the magnetic element alignment plate is engaged between the second side of the engagement panel and the attachment panel.

5. The attachment accessory of claim 1, wherein the at least one magnetic element comprises a generally circular ring-shaped or annular magnetic element.

6. The attachment accessory of claim 5, wherein the at least one magnetic element is compatible with an Apple MagSafe™ magnetic attachment system.

7. The attachment accessory of claim 1, wherein the at least one suction cup comprises at least three suction cups.

8. The attachment accessory of claim 1, wherein the at least one suction cup comprises a plurality of suction cups arranged in an array of rows and columns.

9. The attachment accessory of claim 8, wherein the array of rows and columns of suction cups comprises a four row by four column array of suction cups.

10. The attachment accessory of claim 1, wherein the engagement panel comprises a generally rectangular panel with rounded corners.

11. An attachment accessory for attaching a mobile electronic device to a support surface, the attachment accessory comprising:

a first panel having a first side and a second side, the first side comprising at least one suction cup;

at least one magnetic element; and a second panel having first and second sides, the second panel being attached to the first panel with the at least one magnetic element engaged between the second side of the first panel and the first side of the second panel.

12. The attachment accessory of claim 11, wherein the first panel comprises a raised edge extending transversely from the second side around a perimeter thereof to define a recessed area, and wherein the second panel is engaged within the recessed area and bounded along its sides by the raised edge of the first panel.

13. The attachment accessory of claim 12, wherein the first panel comprises a flexible material.

14. The attachment accessory of claim 13, wherein the flexible material comprises a silicone material.

15. The attachment accessory of claim 11, further comprising a magnetic element alignment plate comprising at least one groove configured to receive the at least one magnetic element, wherein the magnetic element alignment plate is engaged between the second side of the first panel and the second panel.

16. The attachment accessory of claim 11, wherein the at least one magnetic element comprises a generally circular ring-shaped or annular magnetic element.

17. The attachment accessory of claim 16, wherein the at least one magnetic element is compatible with an Apple MagSafe™ magnetic attachment system.

18. The attachment accessory of claim 11, wherein the at least one suction cup comprises at least three suction cups.

19. The attachment accessory of claim 11, wherein the at least one suction cup comprises a plurality of suction cups arranged in an array of rows and columns.

20. The attachment accessory of claim 19, wherein the array of rows and columns of suction cups comprises a four row by four column array of suction cups.

21. The attachment accessory of claim 11, wherein the first panel comprises a generally rectangular panel with rounded corners.

* * * * *